May 1, 1934.     E. D. TILLYER     1,957,117
OPHTHALMIC LENS
Filed Oct. 28, 1933
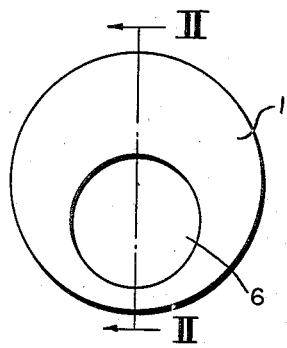
FIG. I.
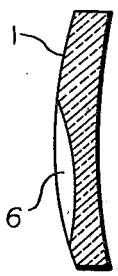
FIG. II.
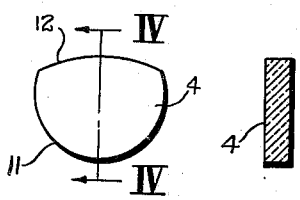
FIG. III.    FIG. IV.
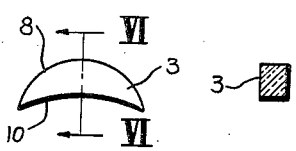
FIG. V.    FIG. VI.
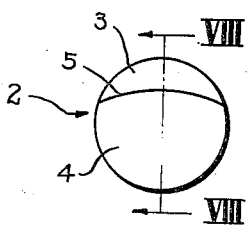
FIG. VII.
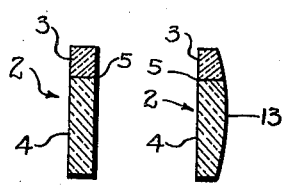
FIG. VIII    FIG IX
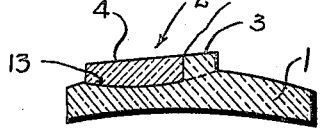
FIG. XI.
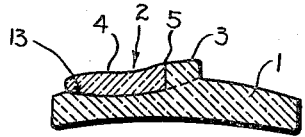
FIG. X.
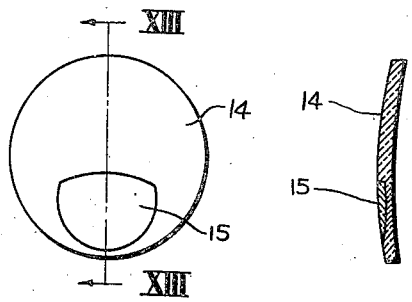
FIG. XII.    FIG. XIII.
INVENTOR
Edgar D. Tillyer.
BY
Harry H. Styll
ATTORNEY Patented May 1, 1934

1,957,117

UNITED STATES PATENT OFFICE 1,957,117

OPHTHALMIC LENS

Edgar D. Tillyer, Southbridge, Mass., assignor to American Optical Company, Southbridge, Mass., a voluntary association of Massachusetts Application October 28, 1933, Serial No. 695,599

6 Claims. (Cl. 88—54)

This invention relates to lenses and more particularly to multifocal or bifocal lenses, and to an improved process of making the same.

This application is a continuation in part of my applications Serial Numbers 628,188 filed August 10, 1932, and 664,117 filed April 3, 1933.

One of the principal objects of the invention is to reduce the expense of making lenses of this character of good color properties by utilizing inexpensive optical crown glass for the major portion of the lens in order to reduce the cost of the glass as well as the cost of handling and production, and especially to avoid the carrying of stocks of different kinds of glass.

Another object of the invention is to reduce wastage in the production of lenses of this general type due to the making of one part of the minor lens of the same glass as the major lens by making said portion of a lower melting point than the major lens so that the finished contacting surfaces of the parts will not be warped or distorted during the fusing operations.

Other objects of the invention are to provide a practical compromise in the reciprocal relative dispersions of the parts of the minor portion in order to obtain expansion factors of the parts so related as to insure stable fusion of the parts without warping or cracking and also to secure melting points lower than that of the major portion to prevent distortion of the uniting surfaces, and preferably different from each other to aid in fusing the two parts of the minor portion together before they are fused to the seat and yet maintained within limits of reciprocal relative dispersions so related to the reciprocal relative dispersion of the major portion as to produce a good lens as regards its color properties before the eye, to provide glasses that will not discolor with use and to provide an economical lens of good appearance having the desirable qualities of the more expensive prior art lenses within the field of practicable usage and requirements. Also to provide in combination with an economical major portion, minor portions that will stably fuse therewith and avoid injurious defects of crystalization, chemical change, distortion of the optical surface of the seat and of the lower melting part during fusion, and that will be of a good white color and will not discolor or tarnish from age.

Other objects and advantages of the invention will become apparent from the following description taken in connection with the accompanying drawing, and it will be apparent that many changes may be made in the details of construction, arrangement of parts and the steps of the process shown and described without departing from the spirit of the invention as expressed in the accompanying claims. I, therefore, do not wish to be limited to the exact details and processes shown and described, as the preferred forms only have been shown by way of illustration.

Referring to the drawing:

Figure I is a view of the seat side of the major blank used in forming the lens.

Figure II is a cross section of Figure I on line II—II thereof;

Figure III is a view of one face of one portion of the minor portion which is to be fused to the seat of the major blank;

Figure IV is a cross section taken along the line IV—IV of Figure III;

Figure V is a view similar to Figure III showing the other part of the minor portion;

Figure VI is a cross section of Figure V taken along the line VI—VI thereof;

Figure VII is a view of one face of the composite minor portion after the parts have been fused together;

Figure VIII is a cross section taken along the line VIII—VIII of Figure VII;

Figure IX is a view similar to Figure VIII showing one surface of the composite minor portion finished;

Figure X is a sectional view showing the parts as formed in the prior art after the minor portion has been fused to the seat of the major blank;

Figure XI is a view similar to Figure X showing the fused blank of this invention;

Figure XII is a view showing the bifocal face of the finished lens; and

Figure XIII is a cross section taken along the line XIII—XIII of Figure XII.

In the past two methods of making so called color free bifocal or multifocal lenses have been employed. In the first method both the glasses for the major portion and the minor portion were special glasses and very expensive. The reciprocal relative dispersions of the glasses were made the same so that they would neutralize each other. In the second method it was attempted to make the major portion of an inexpensive crown glass and the minor portion of glass having the same reciprocal relative dispersion as the major portion, but this method was not successful as the glass of the minor portion would not fuse stably with the major portion so in actual practice a special glass for the major portion was used. In both of these methods the reciprocal relative dispersions were relatively high running from about 54 to 58. In the effort to get neutralization of dispersion the other properties of the glass were neglected. The properties that should be taken into account, and which I have taken into account in my invention are, the index of refraction for optical power requirements, the reciprocal relative dispersions for color considerations, the melting points of the glasses for fusing considerations to prevent distortion of the seat surface and the part having the lower melting point, crystallization due to fusing causing cracking and light defects, chemical changes due to fusion causing milkiness in the parts and discoloration, and the color stability of the glass in use, i. e. the tendency of certain glasses to tarnish and discolor with age.

In many of the ordinary crown glasses in previous use the glass had a decided greenish hue on edge sections, a white glass of course is the ideal and I use such a glass in my invention.

It is therefore a principal object of my invention to provide lenses of good color properties that will avoid these disadvantages and defects of the prior art and at the same time will enable the use of inexpensive glass for the major portion of the lens with minor portions that will combine and fuse with it without the disadvantages set forth above.

In the prior art lenses of this type the major portion was made of a special glass about four times as expensive as the glass I proposed to use for this part of the lens. The upper part of the minor portion was made of the same glass as the major portion. As this part had to be fused to the seat of the major portion it is apparent that there was liability of distorting the surface of the seat which surface has to be maintained to preserve the optical power requirements of the finished lens, I preferably use, although the same glass for the major lens and the upper part of the segment may be used as stated below, for this purpose a glass having the same index of refraction and a slightly lower reciprocal relative dispersion than that of the glass of the major portion but having a lower melting point, so that it will fuse to the finished seat without distortion thereof, and also being of a lower melting point it will fuse quicker and more easily than the prior art glass. For the lower part of the minor portion I use a glass having the same index of refraction as that previously used but a slightly lower reciprocal relative dispersion. As the major portion constitutes the greater part of the lens in bulk and weight it will be seen that by using this cheaper glass I am enabled to provide a great saving in cost of the lens. Also, where I use a glass of lower melting point for the upper part of the minor portion, I reduce wastage due to distortion and at the same time reduce the fusing cost because of the quicker and easier fusing. Also, I reduce the cost and increase the speed of fusing the two parts of the minor portion together. Also, by using a glass of lower melting point for the upper part of the minor portion I reduce the tendency of the lower part of the minor portion to distort and run, as I fuse at a lower temperature.

In order to insure stable fusing of the parts, I find that by using my new combination of glasses for the parts I can obtain expansion factors for all the parts so related that they will fuse together and not warp or crack apart on cooling. However, to obtain these related expansion factors I have compromised the reciprocal relative dispersions of the parts of the minor portion by slightly lowering them but I have not lowered them to an extent that will introduce color disturbances of practical ill effect on the eye. I have found that by this compromise glasses to serve the purpose can be readily obtained. Also, in these glasses I have been able to obtain a greater resistance to tarnish or discoloration than was present in the prior art lenses. My glasses are more stable, resistant, and non-corrosive, and of better color. It is, therefore, a principal object of my invention to obtain these advantages over the prior art lenses. Each of the three glasses used in the production of my invention are new glasses specially compounded for the combination of my invention and first used by me in such combination so far as I am aware. The combination is new and produces results hitherto not obtained.

Referring more particularly to the drawing wherein like characters of reference designate like parts throughout the several views, the device embodying the invention comprises, as shown in Figure XI, a major portion 1 having a composite minor portion 2 secured thereto formed of two pieces of glass 3 and 4 secured together edge to edge on a comating line of joinder 5.

The major portion 1 is of an economical crown lens glass having an index of refraction of about 1.5 and a reciprocal relative dispersion of about 57 to 59. This glass can also be used by lens manufacturers for the production of single vision lenses etc., and has a relatively high melting or softening point. The composition of this glass is about as follows:

| | |
|---|---|
| $SiO_2$ | 71.6 |
| $Na_2O$ | 11.6 |
| $K_2O$ | 2.5 |
| $CaO$ | 11.5 |
| $Sb_2O_5$ | 1.0 |
| $Na_2SO_4$ | 0.8 |
| $Al_2O_3$ | 1.0 |

The expansion factor is such that the glass will successfully and stably fuse with the glasses of the composite minor portion to be described later so that the parts will not crack apart on cooling. The cost of this glass is about one fourth of that of the prior art special glass which this displaces. Formed on one surface of this major blank there is shown a seat 6 shaped to receive the minor portion insert 2 in the manner to be described. This glass is an inexpensive soda, potash lime silica glass specially compounded to avoid the greenish color of the prior art glass previously used, and is of a good white color and practically no more expensive than the said prior art glass.

In Figures V and VI there is shown the part 3 or upper portion of the minor portion, said part in this instance being formed of a different glass than the major blank, but having substantially the same index of refraction and a reciprocal relative dispersion of about 54 to 59 and a lower melting or softening point than said major blank. This portion 3 has its upper portion bounded by an arc 8 of approximately the same radius as the radius of the circle of the seat 6 and its lower part bounded by an arc 10 of a different predetermined radius. The expansion factor of this glass is such that it will successfully and stably fuse with the major blank 1. I may also use for this portion if desired the same glass as I use for the major portion.

The composition of this glass is about as follows:

| | |
|---|---|
| $SiO_2$ | 68.4 |
| $R_2O_3$ | 0.4 |
| $Na_2O$ | 15.8 |
| $K_2O$ | 0.1 |
| $CaO$ | 4.4 |
| $MgO$ | 3.2 |
| $PbO$ | 1.8 |
| $ZnO$ | 5.4 |
| $Sb_2O_3$ | 0.6 |

This glass is a new glass specially compounded for the combination of my invention and has not been previously used in such combination.

The other or lower part 4 of the minor portion, as shown in Figures III and IV, is formed of a high index barium crown glass having an index of refraction of about 1.6 and a reciprocal relative dispersion of about 48 to 54 and a lower melting or softening point than the major blank 1, the melting or softening points of the portions 3 and 4 being very close to each other and both being lower than the major blank 1, 4 being slightly less than 3. The purpose of this arrangement is to enable the composite minor portion 2 to be fused to the seat 6 by raising the temperature only to the softening point of the parts 3 and 4 of the composite minor portion and without softening the major blank 1. Since the softening points of both parts of the minor portion are nearly the same, neither part thereof need run an excessive amount, and since they are both lower than that of the major blank 1, there will be no tendency for the surface of the seat 6 to become warped or distorted during fusing as has happened in prior art lenses of this character, as previously described, wherein the part 3 was of the same glass as the major blank, and for this reason, in order to fuse said part 3 to the major blank, the temperature had to be raised to such a degree as to cause the said major blank to soften with danger of distortion. The part 3, in this instance being of the same index of refraction as the major blank, will merge with the major blank and disappear, the same as in the prior art.

The part 4 is bounded at its lower edge by an arc 11 of approximately the same radius as the radius of the circle of the seat 6 and at its upper edge by an arc 12 of substantially the same radius as the arc 10 of the part 3. It will be noted that the arc 12 is convex, while the arc 10 is concave, so that the two parts will fit together and form a substantially circular disk, as shown in Figure VII. The expansion factor of the part 4 is such that it will successfully and stably fuse with the major blank 1. The composition of the said part 4 which has been used with good results, is about as follows:

| | |
|---|---|
| $SiO_2$ | 40.9 |
| $Na_2O$ | 3.7 |
| $K_2O$ | 2.7 |
| $BaO$ | 29.1 |
| $PbO$ | 8.0 |
| $CaO$ | 3.9 |
| $ZnO$ | 2.3 |
| $Sb_2O_3$ | 1.8 |
| $B_2O_3$ | 2.7 |
| $Fe_2O_3$ } $TiO_2$ | 0.5 |
| $Al_2O_3$ | 0.4 |

This glass is a new glass specially compounded for the combination of my invention and has not, so far as I am aware, been used in such combination.

The parts 3 and 4 are secured together with the edge 10 engaging the edge 12, preferably by fusion, to form the composite minor portion 2. The curve 13 is formed over one face of the composite minor portion so that it will substantially fit the surface of the seat 6. It is then fused to the seat 6 on the major blank, producing the fused blank.

It has been customary to form the part 4 of glass having a greater index of refraction and a lower softening point than the major blank, and to form the part 3 of the same glass as the major blank. When this is done, as described above, the whole assemblage must be raised to the softening point of the major blank in fusing the minor portion to the seat with a possible result of a blank such as shown in Figure X; the part 4, being of a lower softening point, has flowed an excessive amount and the surface of the seat has been distorted due to the fact that the major blank has been softened.

After the fused blank has been formed, a continuous optical surface is formed over the major blank and minor portion on the bifocal side of the blank, and a prescription optical surface is formed on the other side to form the finished lens. This leaves a major field 14 for distance vision and a minor field 15 for near vision. The upper part of the minor portion, as explained, will merge with the major blank and form part of the major field 14 in the finished lens.

While the upper part of the minor portion has been described as having the same index of refraction as the major blank, it will be appreciated that other portions of the minor portion may be formed of such glass, or all parts of the minor portion may be of different index of refraction than the major blank. In the latter case, a lens with three or more focal fields will of course be formed. It is preferable in these cases that the softening points of the parts of the minor portion be lower than that of the major blank, preferably that the softening points of the various parts of the minor portion be close to each other.

If desired, the upper portion of the minor portion may be made of the same glass as the major portion, as was done in the prior art, which allows the cheaper glass of the major portion to be also used as a part of the minor portion. In the minor portion care must be used to maintain the necessary expansion factors and to maintain the reciprocal relative dispersions within a range of good color properties.

In the prior art the first form of fused bifocal or multifocal lenses was a two part lens, the major portion being of crown glass and having an index of refraction of about 1.5 and a reciprocal relative dispersion of about 58 and the minor portion made of flint glass having an index of refraction of about 1.6 and a reciprocal relative dispersion of about 36, i. e., a difference in reciprocal relative dispersions of about 22, which was a very wide difference and caused bad color defects. To overcome these color disturbances the art developed on the theory of equalizing or neutralizing the reciprocal relative dispersions, as it was believed that if this were not done the lenses would be defective because of these color disturbances. To obtain reciprocal relative dispersions that would neutralize it was necessary to use special expensive glasses both for the major and minor portions in order to obtain expansion factors in the two glasses that would permit of stable fusing. These special glasses cost from four to eight times as much as the prior art glasses. I have found, however, that expansion factors properly related can be obtained for the portions of the minor portion if the reciprocal relative dispersion be slightly lowered from that of the major portion, but not to an extent of introducing bad or injurious color defects. In my invention it will be noted that the reciprocal relative dispersions of the parts lie in a range of about 11, which is clearly a marked improvement over the range of 22 of the prior art. By this reduction in reciprocal relative dispersion it is possible to obtain the desired expansion factors, fusing points, and to use the inexpensive crown glass for the major portion and yet maintain the color properties of the lens in good practicable limits.

While I have shown herein that it is possible to obtain glass for the upper portion of the minor portion with a lower fusion point than the major portion, yet this glass is more expensive than the glass of the major portion, perhaps four times as much, and necessitates an extra stock of glass being carried and used; I can by careful and perfected fusion use the same glass for the upper part of the minor portion that I use for the major part, which of course is an economy in glass and in glass stocks, and may well be in the long run more economical than using a different glass for this portion. It is clear, however, that whether I use the same glass or different glasses for this part, I have provided great economy over the prior art by using the inexpensive glass for the major part, thereby making a great saving.

Another advantage of using this glass for the major portion lies in the fact that the art is experienced in the use of such glasses, and well acquainted with its properties and in handling it.

The lens of my invention is practicable and has gone into wide commercial use, thousands having been made and sold, both with the upper portions of the minor portion the same as, and different from, the major portion. The glasses of my lens are also, as has been stated, much more resistant to tarnish and discoloration than the glasses of the prior art.

From the foregoing it will be seen that by a compromise in lowering the reciprocal relative dispersions in a relatively limited range, I am enabled to obtain commercial glasses having the desired expansion factors and fusing points, and that this range, as compared with the prior art having a reciprocal relative dispersion of about 36, will provide lenses having markedly improved color properties over the said prior art. I have found that in this range a relatively large number of different glasses may be obtained commercially.

The glass portion 4 of the optical composition set forth above, that is, refractive index of about 1.6 and a reciprocal relative dispersion of about 48 to 54, can be made stable, which means freedom from corrosion and cracking in use.

It has been found from experience that a bifocal or multifocal lens made of these glasses, that is, glasses having the above optical properties, makes a good reduced color lens free from defects of warping, cracking and corrosion, and free from becoming distorted during fusion, the inherent disadvantages of the prior art.

It will be appreciated that if some other glasses possessing the desired qualities of refraction, dispersion, cost, etc., should become available for use in the major blanks, it would fall within the spirit of this invention to use such glasses and to vary the expansion characteristics of the minor portion glass until the various pieces of glass could be fused together stably.

While the boundary 12 of part 4 has been described as circular it is obvious that it may be made any shape desired.

The glass of the major portion of my invention is different from prior glasses used for this purpose. This glass is a soda, potash, lime silica glass and inexpensive commercially. The properties of optical glasses for lenses of this character are affected by their chemical content about as follows:—Lead usually makes for a lower reciprocal relative dispersion and barium for a higher one. Expansion is effected by the general combination. Resistance to tarnish is effected by zinc, lead and the relatively low percent of alkalies used. Crystallization is effected by the general combination.

It will be seen that the objects set forth and the advantages of the invention are obtained, and that there is set forth a lens which will be practically color-free, which will not have a tendency to crack, warp, discolor, nor become distorted during fusing, and the larger portion of which may be made from inexpensive glass, as well as an improved process for obtaining these results.

Having described my invention, I claim:

1. A multifocal or bifocal lens comprising a major portion of glass having a recessed portion therein, said recessed surface being finished to an optical surface, and a minor lens portion of a plurality of segments of glass fused transversely together edge to edge and fused in the recess of the major portion, said major portion being a silicon, sodium, calcium, optical crown glass containing approximately 71 per cent silicon oxide, 12 per cent sodium oxide and 11 per cent calcium oxide and small percentages of the oxides of potassium and antimony and having a refractive index of about 1.5 and a reciprocal relative dispersion of about 54 to 59, the upper portion of said minor portion being the same glass as the major portion, and the lower portion of the minor portion being a silicon barium glass having approximately 40 per cent of oxide of silicon and 29 per cent of barium oxide with a small percentage of the oxides of lead, zinc, and antimony and having an index of refraction of about 1.6 and a reciprocal relative dispersion of about 49 to 54 and said glasses having substantially the same expansion factor so they will stably unite on fusion.

2. A multifocal or bifocal lens comprising a major portion of glass having a recessed portion therein, said recessed surface being finished to an optical surface, and a minor portion comprising a plurality of segments of glass fused transversely edge to edge and fused in said recess, said major glass comprising in combination the following ingredients in approximately the percentages specified—$SiO_2$, 71 per cent, $Na_2O$, 12 per cent, $K_2O$, 2½ per cent, $CaO$, 11½ per cent, $Sb_2O_5$, 1 per cent, $Al_2O_3$, about 1 per cent or less, and having a refractive index of about 1.5 and a reciprocal relative dispersion of about 54 to 59, the upper part of the minor portion being the same glass as the major portion and the lower portion of the minor portion comprising in combination the following ingredients in approximately the percentages specified, $SiO_2$, 40 per cent, $Na_2O$, 4 per cent, $K_2O$, 2 per cent, $BaO$, 29 per cent, $PbO$, 7 per cent, $ZnO$, 3 per cent, $Sb_2O_3$, 1½ per cent, $B_2O_3$, 3 per cent, $Fe_2O_3$, ½ per cent, $Al_2O_3$, ½ per cent, and having an index of refraction of about 1.6 and a reciprocal relative dispersion of about 49 to 54 and said glasses having substantially the same expansion factor so they will stably unite on fusion.

3. A multifocal or bifocal lens comprising a major portion of glass having a recessed portion therein, said recessed surface being finished to an optical surface, and a minor lens portion of a plurality of segments of glass fused transversely together edge to edge and fused in the recess of the major portion, said major portion being a silicon, sodium, calcium optical crown glass containing approximately 71 per cent silicon oxide, 12 per cent sodium oxide and 11 per cent calcium oxide and small percentages of the oxides of potassium and antimony and having a refractive index of about 1.5 and a reciprocal relative dispersion of about 54 to 59, the upper portion of said minor portion having the same index of refraction as the major portion and substantially the same expansion factor but a lower melting point, and the lower portion of the minor portion being a silicon, barium glass having approximately 40 per cent of oxide of silicon and 29 per cent of barium oxide with a small percentage of the oxides of lead, zinc, and antimony and having an index of refraction of about 1.6 and a reciprocal relative dispersion of about 49 to 54 and said glasses having substantially the same expansion factor so they will stably unite on fusion.

4. A multifocal or bifocal lens comprising a major portion of glass having a recessed portion therein, said recessed surface being finished to an optical surface, and a minor portion comprising a plurality of segments of glass fused transversely edge to edge and fused in said recess, said major glass comprising in combination the following ingredients in approximately the percentages specified, $SiO_2$, 71 per cent, $Na_2O$, 12 per cent, $K_2O$, 2½ per cent, CaO, 11½ per cent, $Sb_2O_5$, 1 per cent, $Al_2O_3$, about 1 per cent or less, and having a refractive index of about 1.5 and a reciprocal relative dispersion of about 54 to 59, the upper portion of said minor portion having the same index of refraction as the major portion, and substantially the same expansion factor but a lower melting point, and the lower portion of the minor portion comprising in combination the following ingredients in approximately the percentages specified, $SiO_2$, 40 per cent, $Na_2O$, 4 per cent, $K_2O$, 2 per cent, BaO, 29 per cent, PbO, 7 per cent, ZnO, 3 per cent, $Sb_2O_3$, 1½ per cent, $B_2O_3$, 3 per cent, $Fe_2O_3$, ½ per cent, $Al_2O_3$, ½ per cent, and having an index of refraction of about 1.6 and a reciprocal relative dispersion of about 49 to 54 and said glasses having substantially the same expansion factor so they will stably unite on fusion.

5. A multifocal or bifocal lens comprising a major portion of glass having a recessed portion therein, said recessed surface being finished to an optical surface, and a minor portion comprising a plurality of segments of glass fused transversely edge to edge and fused in said recess, said major glass comprising in combination the following ingredients in approximately the percentages specified: $SiO_2$, 71 per cent, $Na_2O$, 12 per cent, $K_2O$, 2½ per cent, CaO, 11½ per cent, $Sb_2O_5$, 1 per cent, $Al_2O_3$, about 1 per cent or less, and having a refractive index of about 1.5 and a reciprocal relative dispersion of about 54 to 59, the upper part of the minor portion comprising in combination the following ingredients in approximately the percentages specified: $SiO_2$, 68 per cent, $R_2O_3$, ½ per cent, $Na_2O$, 16 per cent, CaO, 4 per cent, MgO, 3 per cent, PbO, 1½ per cent, ZnO, 5½ per cent and $Sb_2O_3$, ½ per cent, and having an index of refraction of about 1.5 and a reciprocal relative dispersion of about 54 to 59, and the lower portion of the minor portion comprising in combination the following ingredients in approximately the percentages specified, $SiO_2$, 40 per cent, $Na_2O$, 4 per cent, $K_2O$, 2 per cent, BaO, 29 per cent, PbO, 7 per cent, ZnO, 3 per cent, $Sb_2O_3$, 1½ per cent, $B_2O_3$, 3 per cent, $Fe_2O_3$, ½ per cent, $Al_2O_3$, ½ per cent, and having an index of refraction of about 1.6 and a reciprocal relative dispersion of about 49 to 54, and all of said glasses having substantially the same expansion factor so they will stably unite on fusion.

6. A multifocal or bifocal lens comprising a major portion of glass having a recessed portion therein, said recessed surface being finished to an optical surface, and a minor lens portion of a plurality of segments of glass fused transversely together edge to edge and fused in the recess of the major portion said major portion being a silicon, sodium, calcium optical crown glass containing approximately 71 per cent silicon oxide, 12 per cent sodium oxide and 11 per cent calcium oxide and small percentages of the oxides of potassium and antimony and having a refractive index of about 1.5 and a reciprocal relative dispersion of about 54 to 59, the upper portion of said minor portion being a silicon sodium glass having approximately 68 per cent silicon oxide, and 16 per cent sodium oxide with small percentages of the oxides of manganese, lead, and zinc, index of refraction about 1.5 and reciprocal relative dispersion of about 54 to 59, and the lower portion of the minor portion being a silicon, barium glass having approximately 40 per cent of oxide of silicon and 29 per cent of barium oxide with a small percentage of the oxides of lead, zinc and antimony, and having an index of refraction of about 1.6 and a reciprocal relative dispersion of about 49 to 54 and all of said glasses having substantially the same expansion factor so they will stably unite on fusion.

EDGAR D. TILLYER.